(12) United States Patent
Kano

(10) Patent No.: US 9,635,289 B2
(45) Date of Patent: Apr. 25, 2017

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventor: Masaaki Kano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/589,397

(22) Filed: Jan. 5, 2015

(65) Prior Publication Data
US 2015/0195462 A1 Jul. 9, 2015

(30) Foreign Application Priority Data

Jan. 8, 2014 (JP) ................ 2014-001957

(51) Int. Cl.
*H04N 9/82* (2006.01)
*H04N 5/361* (2011.01)
*G11B 27/30* (2006.01)
*H04N 5/367* (2011.01)

(52) U.S. Cl.
CPC ......... *H04N 5/361* (2013.01); *G11B 27/3027* (2013.01); *H04N 5/367* (2013.01)

(58) Field of Classification Search
CPC ............................ H04N 9/8042; H04N 5/367
USPC ................... 386/263; 348/246, 247
See application file for complete search history.

(56) References Cited

U.S. PATENT DOCUMENTS

2006/0007331 A1\* 1/2006 Izumi ..................... H04N 5/367
348/246

FOREIGN PATENT DOCUMENTS

JP 11-112885 A 4/1999

\* cited by examiner

*Primary Examiner* — Thai Tran
*Assistant Examiner* — Mishawn Hunter
(74) *Attorney, Agent, or Firm* — Cowan, Liebowitz & Latman, P.C.

(57) ABSTRACT

The image capturing apparatus includes an image sensor configured to convert light into an electrical signal, the image sensor including an effective pixel portion and a reference pixel portion, and a control unit configured to change compression processing of a signal output from the reference pixel portion in accordance with the number of defective pixels in the reference pixel portion.

24 Claims, 7 Drawing Sheets

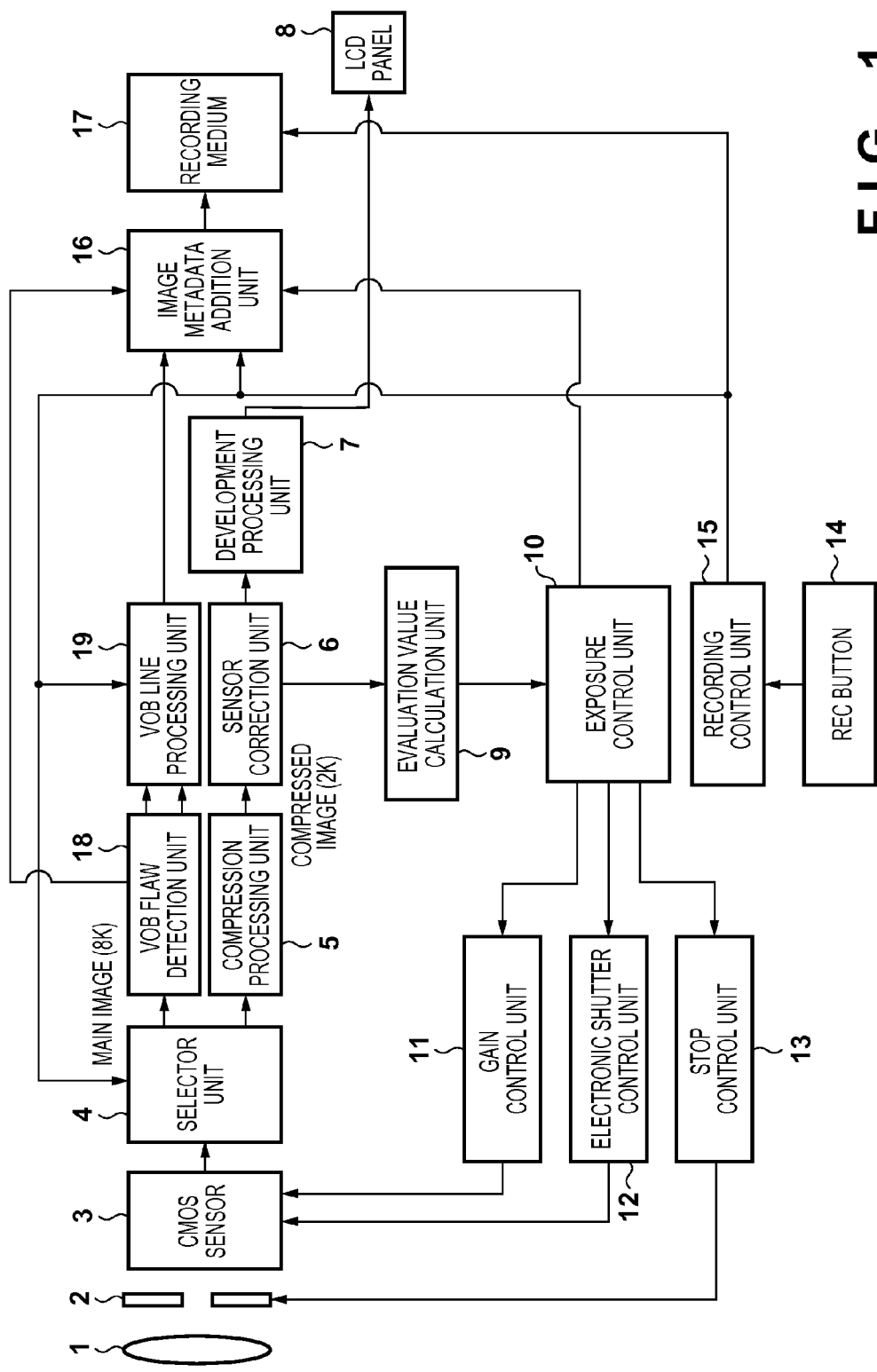
F I G. 1

FIG. 2A

| VOB 11 | VOB 12 | VOB 13 | VOB 14 | VOB 15 | VOB 16 | VOB 17 | VOB 18 |
|---|---|---|---|---|---|---|---|
| VOB 21 | VOB 22 | VOB 23 | VOB 24 | VOB 25 | VOB 26 | VOB 27 | VOB 28 |
| VOB 31 | VOB 32 | VOB 33 | VOB 34 | VOB 35 | VOB 36 | VOB 37 | VOB 38 |
| VOB 41 | VOB 42 | VOB 43 | VOB 44 | VOB 45 | VOB 46 | VOB 47 | VOB 48 |
| VOB 51 | VOB 52 | VOB 53 | VOB 54 | VOB 55 | VOB 56 | VOB 57 | VOB 58 |
| VOB 61 | VOB 62 | VOB 63 | VOB 64 | VOB 65 | VOB 66 | VOB 67 | VOB 68 |
| VOB 71 | VOB 72 | VOB 73 | VOB 74 | VOB 75 | VOB 76 | VOB 77 | VOB 78 |
| VOB 81 | VOB 82 | VOB 83 | VOB 84 | VOB 85 | VOB 86 | VOB 87 | VOB 88 |
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |

FIG. 2B

| R_AVE VOB11 | Gr_AVE VOB12 | AVE VOB | AVE VOB | AVE VOB | AVE VOB | AVE VOB | AVE VOB |
|---|---|---|---|---|---|---|---|
| Gb_AVE VOB21 | B_AVE VOB22 | AVE VOB | AVE VOB | AVE VOB | AVE VOB | AVE VOB | AVE VOB |
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |

FIG. 2C

| VOB 11 | VOB 12 | VOB 13 | VOB 14 | VOB 15 | VOB 16 | VOB 17 | VOB 18 |
|---|---|---|---|---|---|---|---|
| VOB 21 | VOB 22 | VOB 23 | VOB 24 | VOB 25 | VOB 26 | VOB 27 | VOB 28 |
| VOB 31 | VOB 32 | VOB 33 | VOB 34 | VOB 35 | VOB 36 | VOB 37 | VOB 38 |
| VOB 41 | VOB 42 | VOB 43 | VOB 44 | VOB 45 | VOB 46 | VOB 47 | VOB 48 |
| VOB 51 | VOB 52 | VOB 53 | VOB 54 | VOB 55 | VOB 56 | VOB 57 | VOB 58 |
| VOB 61 | VOB 62 | VOB 63 | VOB 64 | VOB 65 | VOB 66 | VOB 67 | VOB 68 |
| VOB 71 | VOB 72 | VOB 73 | VOB 74 | VOB 75 | VOB 76 | VOB 77 | VOB 78 |
| VOB 81 | VOB 82 | VOB 83 | VOB 84 | VOB 85 | VOB 86 | VOB 87 | VOB 88 |
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |

# IMAGE CAPTURING APPARATUS, CONTROL METHOD THEREOF, AND STORAGE MEDIUM

BACKGROUND OF THE INVENTION

Field of the Invention

The present invention relates to an image capturing apparatus, a control method thereof, and a storage medium.

Description of the Related Art

In current television broadcasting, videos compliant with full high definition (full HD) having the image size of 1920 (H)×1080 (V) are used. Furthermore, broadcasting in SHV (Super High Vision, 8K×4K) having higher definition images than those in full HD size is also scheduled recently. In order to implement an image capturing apparatus compliant with the higher definition images described above, a CMOS sensor having the number of pixels corresponding to 8K (7,680 pixels) in a horizontal direction×4K (4,320 lines) in a vertical direction needs to be employed as an image sensor.

In such a CMOS sensor, an amplifier (column amplifier) and an A/D converter (column A/D converter) are provided for each column. As a consequence, the offset variation of the column amplifier and a vertical line which is one of fixed pattern noise (FPN) components caused by the offset variation of the column A/D converter may occur in a shot image. Moreover, since the above-described CMOS sensor has the number of pixels corresponding to 8K×4K, a phenomenon in which an offset level differs in a horizontal direction may occur as a chip area increases, thereby causing dark (dark time) shading.

In order to solve the above-described problem, it is considered to include, inside the image capturing apparatus, a correction circuit which corrects the vertical line generated for each column.

Signal values output from a VOB (Vertical Optical Black) region serving as a light-shielding pixel region included in the CMOS sensor are averaged in the vertical direction, thereby calculating a VOB value for one vertical column. The calculated average VOB value includes a value for each column. This value is subtracted from each column of an effective pixel, thereby correcting the offset variation for each column.

However, since the above-described correction circuit calculates the VOB value for each column and subtracts the value from an effective pixel for each column, the number of correction circuits increases as the number of horizontal pixels of the CMOS sensor is larger. That is, correction circuits for 7,680 columns are needed to correct the 7,680 pixels in the horizontal direction which achieve SHV. Further, power consumption increases along with an increase in the number of correction circuits.

Therefore, outputting image data without performing vertical line correction processing as described above inside the image capturing apparatus, and then performing correction outside the image capturing apparatus is considered.

When RAW image data is output without performing correction inside the image capturing apparatus, VOB pixel data also needs to be output as a part of the RAW image data. An information amount increases if the VOB image data is added to the RAW image data for all pixels and output. To cope with this, a method of outputting the RAW image data after compression processing is proposed (Japanese Patent Laid-Open No. 11-112885).

In Japanese Patent Laid-Open No. 11-112885, however, a video output is obtained by recording image data in an OB portion and image data in an effective pixel portion after compression processing, and then decompressing them at the time of reproduction. In this case, since the effective pixel portion overlaps the OB portion, the image data in the OB portion has an influence on video near the boundary between the OB portion and the effective pixel portion. To prevent this, an extra pixel is provided between the OB portion and the effective pixel portion. By doing so, the image data in the OB portion has no influence on the video near the boundary between the OB portion and the effective pixel portion even if the image data in the OB portion and the image data in the effective pixel portion are compressed to transmit a signal, and are decompressed at the time of reproduction.

This method is effective to reduce the influence on a main image when compressing the image data in the effective pixel portion and the image data in the OB portion to transmit the signal, and decompressing them at the time of reproduction. However, a problem about vertical line noise specific to the CMOS sensor, a problem which arises when VOB includes a defective pixel, and the like remain unsolved.

SUMMARY OF THE INVENTION

The present invention has been made in consideration of the above-described problems, and makes it possible to perform correction processing using an output from an OB pixel portion outside an image capturing apparatus at high precision even if the OB pixel region of an image sensor includes a defective pixel.

According to the first aspect of the present invention, there is provided an image capturing apparatus comprising an image sensor configured to convert light into an electrical signal, the image sensor including an effective pixel portion and a reference pixel portion, and a control unit configured to change compression processing of a signal output from the reference pixel portion in accordance with the number of defective pixels in the reference pixel portion.

According to the second aspect of the present invention, there is provided a control method of an image capturing apparatus which converts light into an electrical signal, and includes an effective pixel portion and a reference pixel portion, comprising a control step of changing compression processing of a signal output from the reference pixel portion in accordance with the number of defective pixels in the reference pixel portion.

Further features of the present invention will become apparent from the following description of exemplary embodiments with reference to the attached drawings.

BRIEF DESCRIPTION OF THE DRAWINGS

FIG. 1 is a block diagram showing the arrangement of an image capturing apparatus according to the first embodiment of the present invention;

FIG. 2A is a schematic table showing the pixel structure of a CMOS sensor in the image capturing apparatus according to the first embodiment;

FIG. 2B is a schematic table showing the pixel structure of RAW image data obtained by performing compression processing on VOB in the image capturing apparatus according to the first embodiment;

FIG. 2C is a schematic table for explaining that VOB includes a defective pixel in the pixel structure in the CMOS sensor in the image capturing apparatus according to the first embodiment;

DESCRIPTION OF THE EMBODIMENTS

Figure 3:
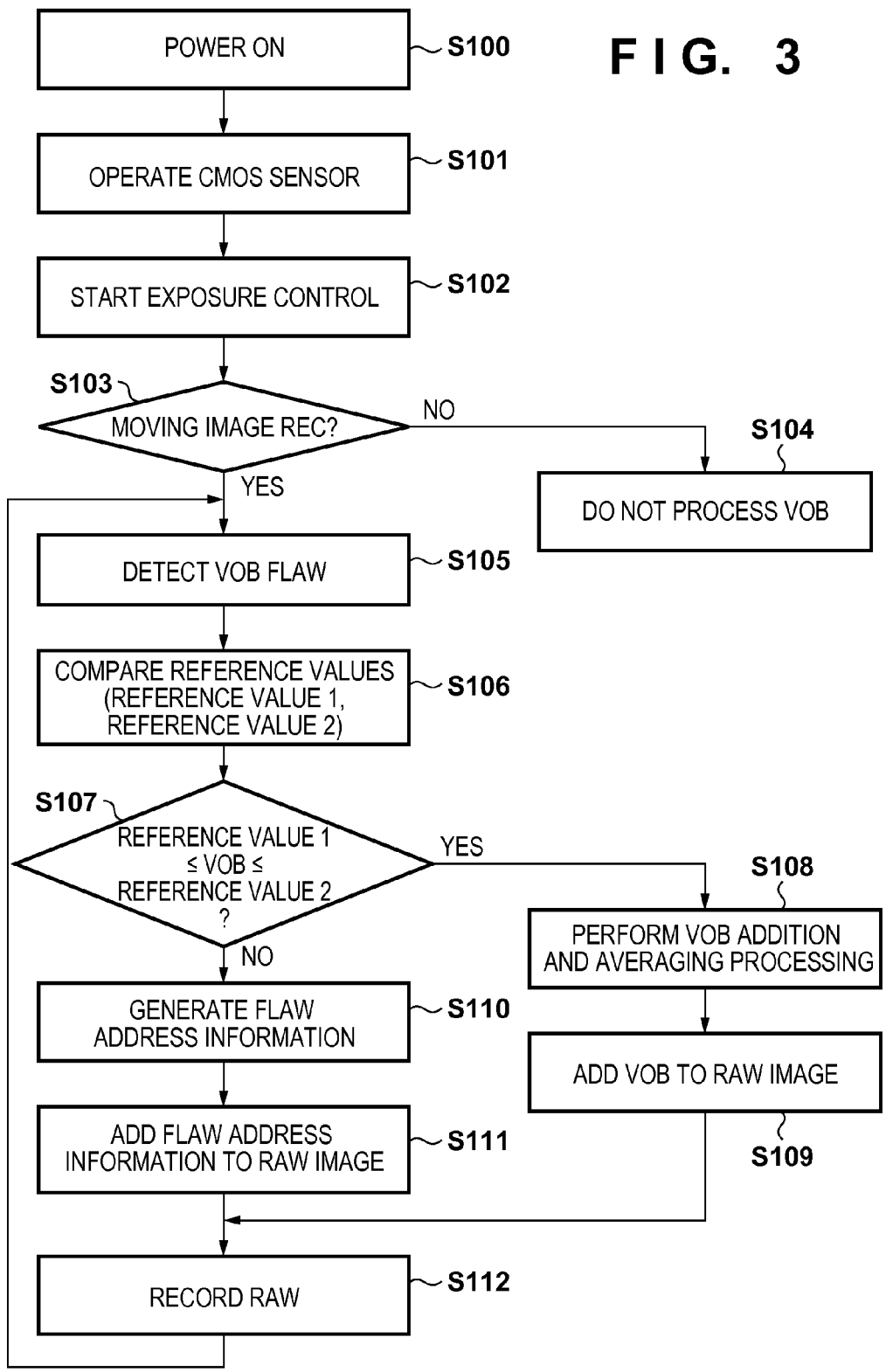
FIG. 3 is a flowchart showing the operations of VOB processing in the first embodiment.

Embodiments of the present invention will be described below in detail with reference to the accompanying drawings.

An image capturing apparatus according to this embodiment includes a lens which forms an image capturing unit for capturing an object, a stop for controlling the amount of light entering from the lens, and a CMOS sensor serving as an image sensor which converts the incident light from the lens into an electrical signal. The CMOS sensor includes a VOB pixel region (vertical optical black pixel portion) arranged outside an effective pixel portion. The image capturing apparatus also includes a REC button which instructs the recording start and the recording end of an object image. The image capturing apparatus further includes a compression processing unit which performs image compression for image display during shooting, an evaluation value calculation unit for exposure control, an exposure control unit, a gain control unit, an electronic shutter control unit, and a stop control unit.

The image capturing apparatus further includes a VOB flaw detection unit which detects a defective pixel in a VOB region output from the CMOS sensor when the REC button instructs image recording. The image capturing apparatus further includes a VOB line processing unit which performs compression processing on VOB to be added to RAW image data in accordance with the detection result. The image capturing apparatus further includes an image metadata addition unit for adding the address information of the defective pixel detected by the VOB flaw detection unit to output RAW image data from the VOB line processing unit and a recording medium which records the output RAW image data.

With this arrangement, a change is made to processing of the VOB image data added to the RAW image data to be recorded in accordance with the detection result of the defective pixel in the VOB region output from the CMOS sensor when the REC button instructs image recording. Furthermore, the address information of the defective pixel is recorded after it is added to the RAW image data.

First Embodiment

FIG. 1 is a block diagram showing the arrangement of an image capturing apparatus according to the first embodiment of the present invention. In FIG. 1, object light which has passed through a lens 1 enters a CMOS sensor 3 via a stop 2 which controls the amount of incident light. The CMOS sensor 3 serving as an image sensor performs A/D conversion on an analog electrical signal obtained by photoelectrically converting the incident object light, and then outputs the obtained signal to a selector unit 4 as RAW image data. The number of pixels included in the CMOS sensor 3 is 8K (7,680 pixels) in a horizontal direction×4K (4,320 pixels) in a vertical direction which achieve, for example, SHV (Super High Vision).

The selector unit 4 performs output switching of the input RAW image data depending on a recording state or a recording standby state. Note that a control signal input from a REC button 14 via a recording control unit 15 controls the start or end of recording.

An operation during recording standby will now be described. During the recording standby, the selector unit 4 outputs the RAW image data to a compression processing unit 5. The compression processing unit 5 performs compression processing to reduce, for example, in each of the horizontal and the vertical directions, the number of pixels to a quarter (the output RAW image data is 1,920 pixels in the horizontal direction×1,080 pixels in the vertical direction). As a compression processing method, there are pixel thinning processing of thinning out the pixels by a quarter in each of the horizontal and the vertical directions, pixel addition processing of performing 4-pixel addition (16-pixel addition) in each of the horizontal and the vertical directions, reduction processing using a filter such as a bicubic filter, and the like.

The RAW image data (compressed RAW image data) compressed by the compression processing unit 5 is output to a sensor correction unit 6. The sensor correction unit 6 corrects vertical line noise caused by the offset variation of a column amplifier provided for each column inside the CMOS sensor and the offset variation of column A/D converter.

In order to correct vertical line noise, first, output signals from the VOB pixel region made of light-shielding pixels included in the CMOS sensor are averaged in the vertical direction. For example, when the light-shielding pixels are provided in 16 lines in the VOB pixel region of the CMOS sensor, averaging processing is performed for 16 lines, thereby generating VOB data of one line. The offset variation of each column which is the main cause of vertical line noise is corrected by subtracting the generated VOB data of one line from effective pixel data of each column.

The compressed RAW image data whose vertical line noise has been corrected undergoes synchronization interpolation (debayer) processing and video signal processing such as color correction, gamma correction, and YCbCr conversion in a development processing unit 7, and then is output, as a video signal, to an LCD panel 8 which displays an image.

At the same time, a signal is output from the sensor correction unit 6 to an evaluation value calculation unit 9 and the evaluation value calculation unit 9 generates an evaluation value for exposure control. This evaluation value is input to an exposure control unit 10 and determination of whether a current exposure state is correct is made. If it is determined that the current exposure state is not correct, control signals are output to a gain control unit 11, an electronic shutter control unit 12, and a stop control unit 13 to perform exposure control in order to obtain the correct exposure state.

An operation during recording will now be described. When the recording start is instructed by operating the REC button 14, a control signal is output from the REC button 14 to the selector unit 4 via the recording control unit 15. Then, the RAW image data output from the CMOS sensor and input to the selector unit 4 is output to a VOB flaw detection unit 18.

The VOB flaw detection unit 18 determines, as compared with a preset reference value, whether a defective pixel is present in image data in the VOB region included in the input RAW image data. If the defective pixel is detected, the number of detected defective pixels is also determined. If it is determined in the determination result that there is no defective pixel or the number of detective pixel is less than a predetermined number of detected defective pixels, the VOB flaw detection unit 18 outputs the RAW image data including the VOB image data and the determination result to a VOB line processing unit 19.

The VOB line processing unit 19 adds and averages the image data in the VOB region included in the RAW image data for each line (row) corresponding to each of color planes (R, Gr, Gb, and B) to form one line by each color plane, and then adds the obtained data to the input RAW image data to output the sum to an image metadata addition unit 16. The image metadata addition unit 16 receives not only the RAW image data but also a gain control value, an electronic shutter control value, and a stop control value each serving as a current exposure control value from the exposure control unit 10. The information is added to the RAW image data as camera metadata, and then output to a recording medium 17. The recording medium 17 records the input RAW image data.

On the other hand, if it is determined in a defective pixel determination result by the VOB flaw detection unit 18 that there is a defective pixel in the VOB pixel region or the number of defective pixels is more than a predetermined number of detected defective pixels, the VOB flaw detection unit 18 outputs the RAW image data including the image data in the VOB region and the determination result to the VOB line processing unit 19. Furthermore, the VOB flaw detection unit 18 outputs the address information (X, Y) of the defective pixel to the image metadata addition unit 16 and stores the address information.

The VOB line processing unit 19 outputs, based on the input RAW image data and the defective pixel determination result, the unprocessed RAW image data to the image metadata addition unit 16. The image metadata addition unit 16 receives the RAW image data from the VOB line processing unit 19, the gain control value, the electronic shutter control value, and the stop control value from the exposure control unit 10, and the address information (X, Y) of the defective pixel from the VOB flaw detection unit 18.

The image metadata addition unit 16 adds the received gain control value, the electronic shutter control value, and the stop control value and the address information (X, Y) of the defective pixel to the RAW image data as the camera metadata, and then outputs them to the recording medium 17. The recording medium 17 records the input RAW image data.

Vertical addition and averaging processing as one of the compression processing of the image data in the VOB region based on the defective pixel determination in the VOB pixel region in the RAW image data will now be described with reference to FIGS. 2A, 2B, and 2C.

FIG. 2A is the RAW image data output from the CMOS sensor and includes, for example, the VOB pixel region of 8 (row)×8 (column) (=64 pixels). The output signals of 64 pixels in the VOB pixel region are compared with the preset reference value, thereby determining whether the defective pixel is present.

As the above-described reference values, a reference value 1 for detecting a defective pixel (black flaw) having a value lower than that of VOB and a reference value 2 for detecting a defective pixel (white flaw) having a value higher than that of VOB are set. The defective pixels are determined in the following conditions.

condition 1: VOB pixel value<reference value 1→determined as a black flaw condition 2: VOB pixel value>reference value 2→determined as a white flaw condition 3: reference value 1≤VOB pixel value≤reference value 2→determined as a normal pixel The compression processing of the VOB image data within the RAW image data if it is determined in the above-described determination result that there is no defective pixel in the VOB pixel region will now be described with reference to FIG. 2B.

If it is determined in the above-described determination result that all 64 pixels in the VOB pixel region meet the condition 3 and there is no defective pixel, the RAW image data in the pixel structure shown in FIG. 2B is recorded on the recording medium.

In the compression processing of the VOB image data, a VOB pixel corresponding to each color plane is generated by vertical addition and averaging processing. Respective pixel data R_AVEVOB11, Gb_AVEVOB21, Gr_AVEVOB12, and B_AVEVOB22 shown in FIG. 2B are obtained by performing addition processing as in equations (1) to (4).

$$R\_AVEVOB11=(VOB11+VOB31+VOB51+VOB71)/4 \quad (1)$$

$$Gb\_AVEVOB21=(VOB21+VOB41+VOB61+VOB81)/4 \quad (2)$$

$$Gr\_AVEVOB12=(VOB12+VOB32+VOB52+VOB72)/4 \quad (3)$$

$$B\_AVEVOB22=(VOB22+VOB42+VOB62+VOB82)/4 \quad (4)$$

Addition processing similar to that on the first and the second rows is performed on the third and subsequent rows in the VOB pixel region as well. As described above, if it is determined that there is no defective pixel in the VOB pixel region, the output image data (8 (row)×8 (column)) in the VOB pixel region included in the RAW image data output from the CMOS sensor undergoes compression processing into 2 (row)×8 (column).

The compression processing of the VOB image data within the RAW image data if it is determined in the above-described determination result that there is the defective pixel in the VOB pixel region will now be described with reference to FIG. 2C.

If it is determined in the above-described determination result that any of the pixels in the VOB pixel region meets the condition 1 or the condition 3 and there is the defective pixel, the RAW image data in the pixel structure shown in FIG. 2C is recorded on the recording medium.

That is, if it is determined that there is the defective pixel, the compression processing of the VOB image data shown in FIG. 2B is not performed, and the input RAW image data is output without processing and the address information (X, Y) of the defective pixel is also output. For example, in the case of FIG. 2C, the following result is obtained.

VOB31: (X, Y)=(1, 3) white flaw

VOB55: (X, Y)=(5, 5) black flaw

X: horizontal-direction address, Y: vertical-direction address

As described above, different processing operations are performed for the VOB image data in accordance with the defective pixel determination result in the VOB pixel region within the RAW image data.

The compression processing of the VOB image data in accordance with the defective pixel determination result in the VOB pixel region within the RAW image data and the operations of RAW recording will now be described with reference to a flowchart in FIG. 3.

When the image capturing apparatus is powered on (step S100), the CMOS sensor starts operating (step S101), and exposure control starts (step S102).

Then, it is determined whether the REC button 14 included in the image capturing apparatus instructs the recording start (step S103). If the recording standby state is kept in the determination result in step S103, the compression processing of the VOB image data within the RAW image data output from the CMOS sensor is not performed (step S104). On the other hand, if it is determined in the determination result in step S103 that the recording start has been instructed, it is detected whether the defective pixel is present in the pixel which forms the VOB pixel region within the RAW image data (step S105).

Comparison is made between the pixel output value in this VOB pixel region and the reference values (the reference value 1 and the reference value 2) preset in the image capturing apparatus (step S106), thereby determining whether the pixel output value is the reference value 1 or more or the reference value 2 or less (step S107).

If it is determined in this determination result that the pixel output value is the reference value 1 or more or the reference value 2 or less, the vertical addition and averaging processing is performed in the pixel corresponding to each color plane in the VOB pixel region within the RAW image data (step S108). After that, the VOB image data obtained after the addition and averaging processing is added to the RAW image data (step S109), and the processed RAW image data is recorded on the recording medium (step S112).

On the other hand, if it is determined in the determination result in step S107 that the pixel output value is less than the reference value 1 or larger than the reference value 2, the address information of the determined defective pixel in the VOB pixel region is generated (step S110).

Then, the generated address information of the defective pixel in the VOB pixel region is added to the RAW image data from the CMOS sensor (step S111). The RAW image data is recorded on the recording medium (step S112).

The above-described operations (from steps S103 to S112) are repeated during recording.

As described above, when the recording of the RAW image data output from the CMOS sensor starts, the processing of the VOB image data is changed in accordance with the determination result of whether the defective pixel is present in the VOB pixel region within the RAW image data. That is, the compression processing of the VOB image data is performed when there is no defective pixel in the VOB region, whereas the compression processing is not performed but processing of adding the address information of the defective pixel to the RAW image data is performed when there is the defective pixel in the VOB pixel region.

This makes it possible to prevent the operation error of vertical line correction performed in an external apparatus without being influenced by the defective pixel in the VOB pixel region, and reduce a data amount by performing the compression processing of the VOB image data inside the image capturing apparatus in a shooting state where an additional defective pixel does not occur.

Note that in the above-described first embodiment, for the RAW image data output from the CMOS sensor, the compression processing of the VOB image data is performed in a processing circuit provided outside the CMOS sensor. However, the compression processing may be performed in a processing circuit inside the CMOS sensor.

Further, the vertical addition and averaging processing has been described as the compression processing of the VOB image data. However, if it is determined that there is the defective pixel in the VOB pixel region, the RAW image data may be recorded after skipping a row (line) having the defective pixel.

Second Embodiment

In the above-described first embodiment, the method of determining the defective pixel in the VOB pixel region within the RAW image data during recording and changing the processing of the VOB image data based on the determination result, and the method of adding defective pixel address information to the RAW image data have been described. In the second embodiment, a method of performing the processing of VOB image data within RAW image data in accordance with an ISO sensitivity setting value of an image capturing apparatus will be described with reference to FIGS. 4, 5, and 6.

Figure 4:
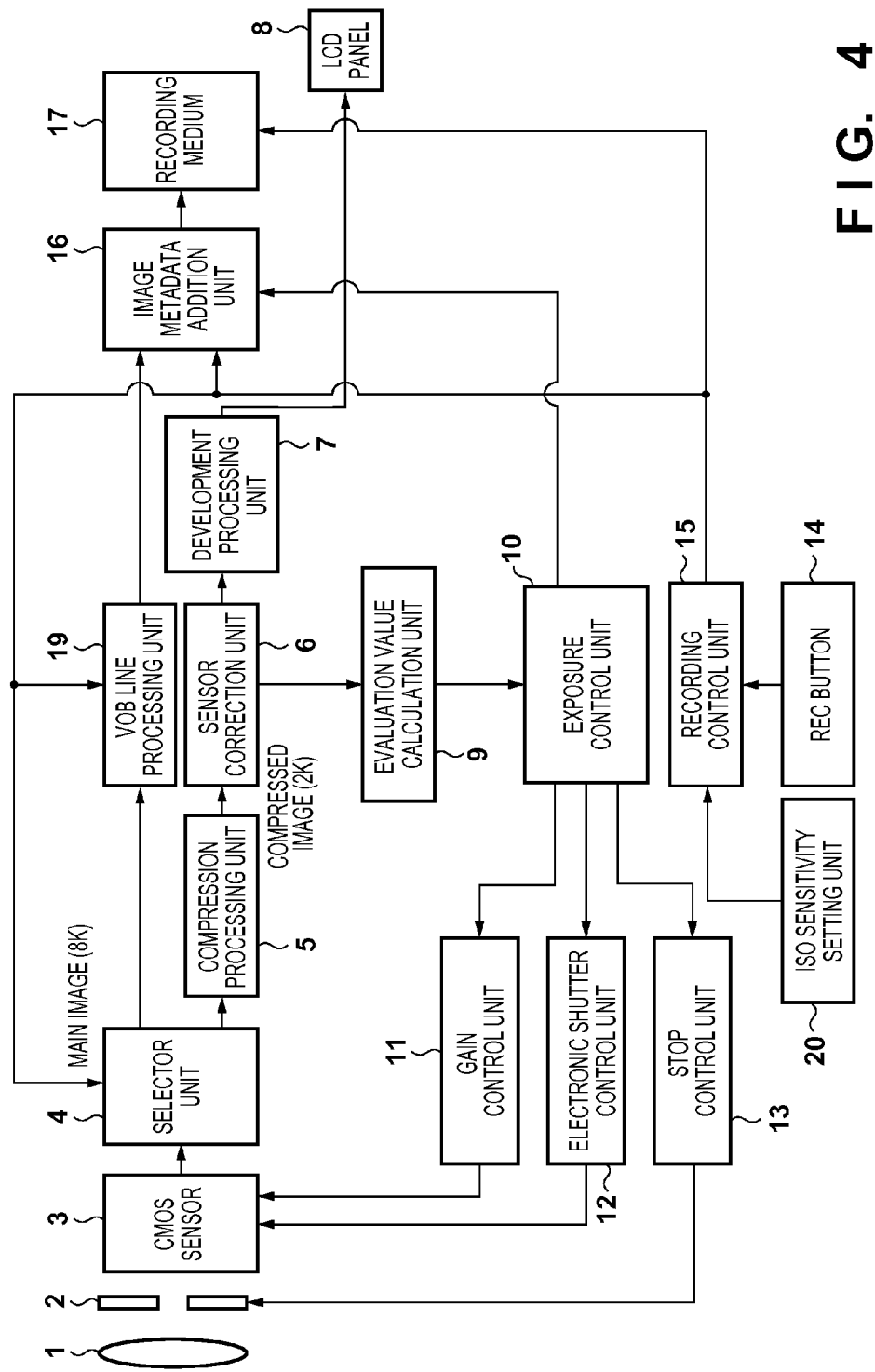
FIG. 4 is a block diagram showing the arrangement of an image capturing apparatus according to the second embodiment of the present invention.

Unlike the block diagram shown in FIG. 1, a VOB flaw detection unit 18 is omitted and an ISO sensitivity setting unit 20 is added in FIG. 4. ISO sensitivity information set by the ISO sensitivity setting unit 20 is output to a VOB line processing unit 19 via a recording control unit 15 during recording. The VOB line processing unit 19 compares the ISO sensitivity information input from the recording control unit 15 and a preset reference value. If it is determined that the set ISO sensitivity is below the reference value, that is, in a low ISO sensitivity setting, the compression processing of the VOB image data within the RAW image data is performed. A compression processing method is the same as that described in the first embodiment, and the description thereof will be omitted.

On the other hand, if it is determined from the above-described comparison result that the set ISO sensitivity is equal to or larger than the reference value, that is, in a high ISO sensitivity setting, the VOB image data within the input RAW image data is output without undergoing compression processing.

An image metadata addition unit 16 receives the RAW image data output from the VOB line processing unit 19, adds a current ISO sensitivity setting value input via the ISO sensitivity setting unit 20 and the recording control unit 15 to the RAW image data, and records it on a recording medium 17.

The processing method of the VOB image data within the RAW image data by the above-described ISO sensitivity setting value will now be described with reference to FIGS. 2A and 2B.

The RAW image data output from a CMOS sensor including an 8 (row)×8 (column) (=64 pixels) VOB pixel region shown in FIG. 2A will be processed as follows. That is, the current ISO sensitivity setting value is compared with a preset reference value (for example, ISO800) and then if it is determined that it is in the low ISO setting (less than ISO800), the VOB image data undergoes compression processing and is recorded, as shown in FIG. 2B.

On the other hand, if it is determined in the above-described comparison result that the current ISO sensitivity setting value is in the high ISO setting (equal to or larger than ISO800), the compression processing of the VOB image data is not performed and the image data in FIG. 2A is recorded intact. As described above, the processing of the VOB image data within the RAW image data is changed in accordance with the ISO sensitivity setting value during shooting.

The compression processing of the VOB image data within the RAW image data in the ISO sensitivity setting value during recording and the operations of RAW recording will now be described with reference to a flowchart in FIG. 5.

Figure 5:
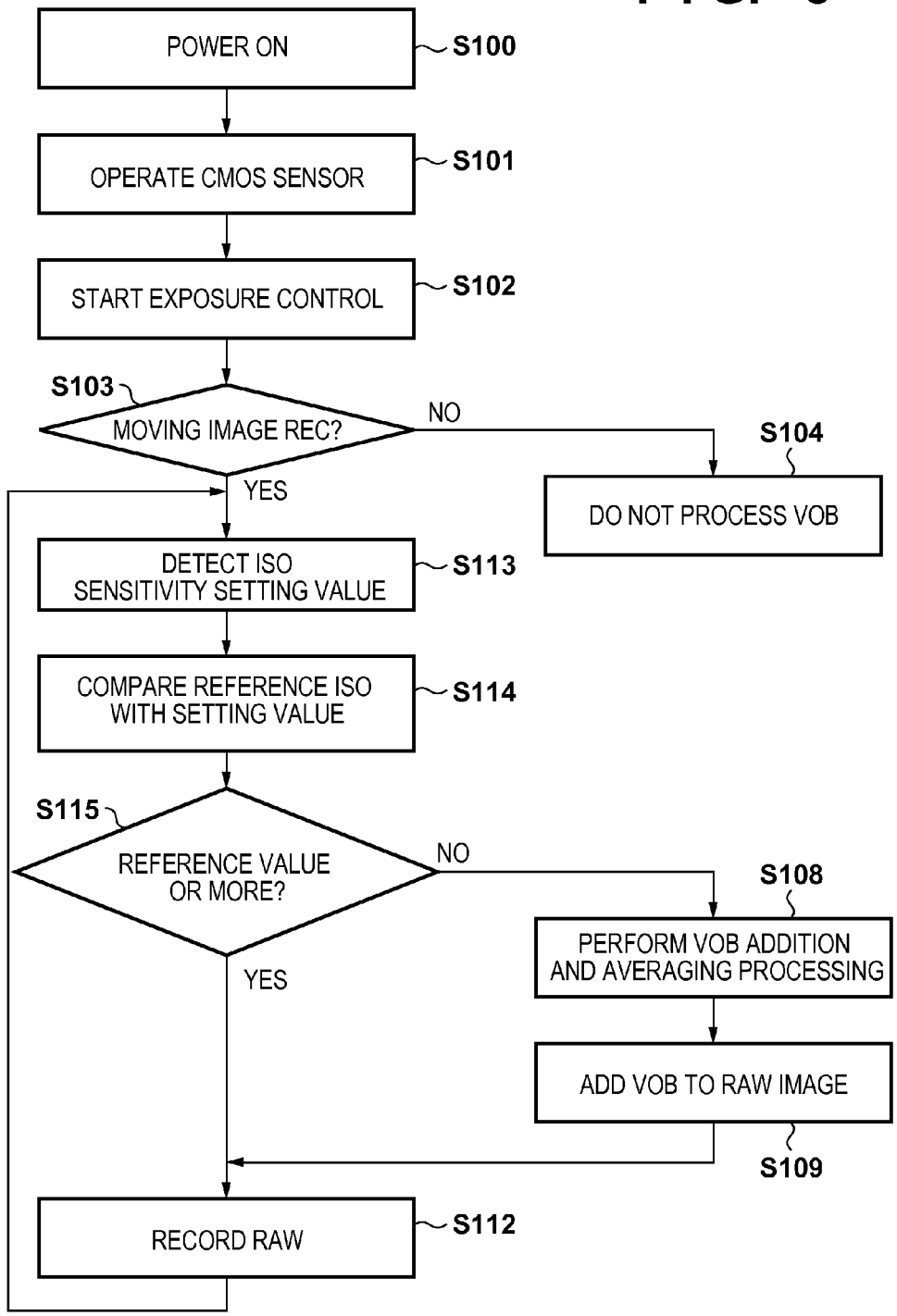
FIG. 5 is a flowchart showing the operations of VOB processing in the second embodiment.

From an operation of powering on the image capturing apparatus to an operation of determining an recording start instruction (from step S100 to step S103) shown in FIG. 5 and an operation in a recording standby state are the same as those in the first embodiment, and the description thereof will be omitted.

Then, in determination of whether the recording start has been instructed (step S103), if it is determined that the recording start has been instructed, the current ISO sensitivity setting value is detected (step S113).

Then, comparison is made between the detected ISO sensitivity setting value and a reference value representing an ISO sensitivity value to be a reference preset in the image capturing apparatus (step S114), thereby determining whether the ISO sensitivity setting value is equal to or larger than the reference value (step S115).

If it is determined in the determination result that the ISO sensitivity setting value is less than the reference value, vertical addition and averaging processing is performed on a pixel corresponding to each color plane in the VOB pixel region within the RAW image data (step S108). After that, the VOB image data obtained after the addition and averaging processing is added to the RAW image data (step S109), and the processed RAW image data is recorded on the recording medium (step S112).

On the other hand, if it is determined that the ISO sensitivity setting value is equal to or larger than the reference value, the VOB image data within the input RAW image data is recorded intact on the recording medium without undergoing compression processing (step S112). The above-described operations (from steps S103 to S112) are repeated during recording.

As described above, the operation of changing the processing of the VOB image data within the RAW image data is performed in accordance with the ISO sensitivity setting value during recording. This makes it possible to prevent the operation error of vertical line correction performed in an external apparatus without influenced by noise and the defective pixel generated in the high ISO setting. In a shooting state where neither noise nor defective pixel occurs, it is also possible to reduce a data amount by performing the compression processing of the VOB image data inside the image capturing apparatus.

Note that in the second embodiment, the compression method of the VOB image data is changed in accordance with the ISO sensitivity setting value during shooting. However, the compression method of the VOB image data may be changed in accordance with the accumulation time of the CMOS sensor.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-001957, filed Jan. 8, 2014 which is hereby incorporated by reference herein in its entirety.

What is claimed is:

1. An image capturing apparatus comprising:
an image sensor configured to convert light into an electrical signal, said image sensor including an effective pixel portion and a reference pixel portion; and
a control unit configured to change compression processing of a signal output from the reference pixel portion in accordance with the number of defective pixels in the reference pixel portion;
wherein if the number of defective pixels in the reference pixel portion is less than a predetermined number, said control unit controls to compress the signal from the reference pixel portion.

2. The apparatus according to claim 1, wherein
if the number of defective pixels in the reference pixel portion is less than a predetermined number, said control unit controls to add data obtained by compressing the signal from the reference pixel portion to RAW image data in the effective pixel portion and record a sum on a recording medium, and
if the number of defective pixels in the reference pixel portion is not less than the predetermined number, said control unit controls to add uncompressed data in the reference pixel portion and address information of the defective pixel to the RAW image data obtained from the effective pixel portion and record a sum on the recording medium.

3. The apparatus according to claim 2, wherein said control unit stores the address information of the defective pixel in the reference pixel portion in metadata to be added to the RAW image data.

4. The apparatus according to claim 1, wherein a processing circuit for compressing the signal from the reference pixel portion is included outside said image sensor.

5. The apparatus according to claim 1, wherein said control unit compresses the signal from the reference pixel portion for each row to reduce amount of the signal by addition and averaging processing.

6. The apparatus according to claim 5, wherein if the number of defective pixels in the reference pixel portion is not less than a predetermined number, said control unit compresses the signal from the reference pixel portion by skipping the defective pixel and performing the addition and averaging processing.

7. The apparatus according to claim 5, wherein the control unit compresses the signal from the reference pixel portion for each row corresponding to each of color planes to form one row by each color plane by addition and averaging processing.

8. The apparatus according to claim 1, further comprising a detection unit configured to detect whether the defective pixel is present in the reference pixel portion.

9. The apparatus according to claim 1, wherein the reference pixel portion includes an optical black pixel portion.

10. A control method of an image capturing apparatus which converts light into an electrical signal, and includes an effective pixel portion and a reference pixel portion, comprising:
changing compression processing of a signal output from the reference pixel portion in accordance with the number of defective pixels in the reference pixel portion;
wherein in the changing, if the number of defective pixels in the reference pixel portion is less than a predetermined number, the signal from the reference pixel portion is compressed.

11. The method according to claim 10, wherein in the changing, if the number of defective pixels in the reference pixel portion is less than a predetermined number, data obtained by compressing the signal from the reference pixel portion is controlled to be added to RAW image data in the effective pixel portion and recorded on a recording medium, and if the number of defective pixels in the reference pixel portion is not less than the predetermined number, uncompressed data in the reference pixel portion and address information of the defective pixel are controlled to be added to the RAW image data obtained from the effective pixel portion and recorded on the recording medium.

12. The method according to claim 11, wherein in the changing, the address information of the defective pixel in the reference pixel portion is stored in metadata to be added to the RAW image data.

13. The method according to claim 10, wherein a processing circuit included outside the image sensor compresses the signal from the reference pixel portion.

14. The method according to claim 10, wherein in the changing, the signal from the reference pixel portion is compressed for each row to reduce amount of the signal by addition and averaging processing.

15. The method according to claim 14, wherein if the number of defective pixels in the reference pixel portion is not less than a predetermined number, in the changing, the signal from the reference pixel portion is compressed by skipping the defective pixel and performing the addition and averaging processing.

16. The method according to claim 10, further comprising detecting whether the defective pixel is present in the reference pixel portion.

17. The method according to claim 10, wherein the reference pixel portion includes an optical black pixel portion.

18. The method according to claim 10, wherein in the changing, the signal from the reference pixel portion is compressed for each row corresponding to each of color planes to form one row by each color plane by addition and averaging processing.

19. A non-transitory computer-readable storage medium storing a program that causes a computer to execute respective steps of a control method of an image capturing apparatus which converts light into an electrical signal, and includes an effective pixel portion and a reference pixel portion,
the method comprising:
changing compression processing of a signal output from the reference pixel portion in accordance with the number of defective pixels in the reference pixel portion,
wherein in the changing, if the number of defective pixels in the reference pixel portion is less than a predetermined number the signal from the reference pixel portion is compressed.

20. An image capturing apparatus comprising:
an image sensor configured to convert light into an electrical signal, said image sensor including an effective pixel portion and a reference pixel portion;
a first controller configured to control a degree of compression of the signal to be output from the image sensor; and
a determination unit configured to determine whether image recording is instructed,
wherein the first controller performs a first compressing process to reduce an amount of the signal from the reference pixel portion by a predetermined degree of compression, and
wherein if the determination unit determines that the image recording is instructed, the first controller changes the predetermined degree of compression based on comparison result between a value of the signal from the reference pixel portion and a predetermined reference value.

21. The apparatus according to claim 20, wherein the first controller changes the degree of compression of the signal from the reference pixel portion based on a number of defective pixels, which is obtained by the comparison result, in the reference pixel portion.

22. The apparatus according to claim 21, wherein the first controller generates information related to the address of the defective pixels based on detection result of defective pixels in the reference pixel portion.

23. The apparatus according to claim 20, further comprising:
a second controller configured to perform a second compressing process to reduce the amount of the signal from the reference pixel portion and the effective pixel portion; and
a selector configured to switch whether to input the signal output from the image sensor to the first control unit or to the second control unit based on determination of the determination unit.

24. The apparatus according to claim 20, wherein a first controller for reducing amount of the signal to be output from the image sensor is included inside said image sensor.

* * * * *